Oct. 16, 1962 H. B. AXTELL 3,058,211
METHOD AND APPARATUS FOR SECURING A STUD OR SCREW
Filed Sept. 29, 1958 2 Sheets-Sheet 1

INVENTOR.
HAROLD B. AXTELL
BY
Flam and Flam
ATTORNEYS.

Oct. 16, 1962  H. B. AXTELL  3,058,211
METHOD AND APPARATUS FOR SECURING A STUD OR SCREW
Filed Sept. 29, 1958  2 Sheets-Sheet 2

INVENTOR.
HAROLD B. AXTELL
BY
Flam and Flam
ATTORNEYS.

United States Patent Office 3,058,211
Patented Oct. 16, 1962

3,058,211
METHOD AND APPARATUS FOR SECURING A STUD OR SCREW
Harold B. Axtell, 1222 Blair Ave., South Pasadena, Calif.
Filed Sept. 29, 1958, Ser. No. 764,171
9 Claims. (Cl. 29—509)

This invention relates to a method of affixing a screw or stud to another member so that its threads are accessible, and also to apparatus for carrying out this method.

A screw or stud can be affixed to another member, such as a ground clamp (to provide a terminal electrical connection), by various means in addition to the nut-and-lock-nut method. For example, the screw can be affixed by welding, soldering or the like. All of these tedious processes are relatively expensive.

The primary object of this invention is to provide a simple and inexpensive means for securing a screw or stud to another member and without requiring any parts, such as nuts or the like, affixed to the stud or screw.

Another object of this invention is to provide a method of this character which, in a single operation, secures the screw or stud not only against axial separation but also against angular movement about its own axis.

Another object of this invention is to provide a method in which a screw or stud is secured by controlled columnar buckling, whereby an integral ring is formed from the stud or screw itself. The ring and the head together grip the support member to which the stud or screw is to be attached. The end of the stud is kept intact so that it can cooperate suitably with structures such as removable ground lugs. The ring also partially flows into one or more cavities or keyways in the member for restraining angular movement of the stud.

Another object of this invention is to provide simple apparatus whereby the process can be performed with a simple hydraulic, air-operated or other type of press.

Another object of this invention is to provide simple means whereby controlled buckling is accomplished without causing splitting of the screw head.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
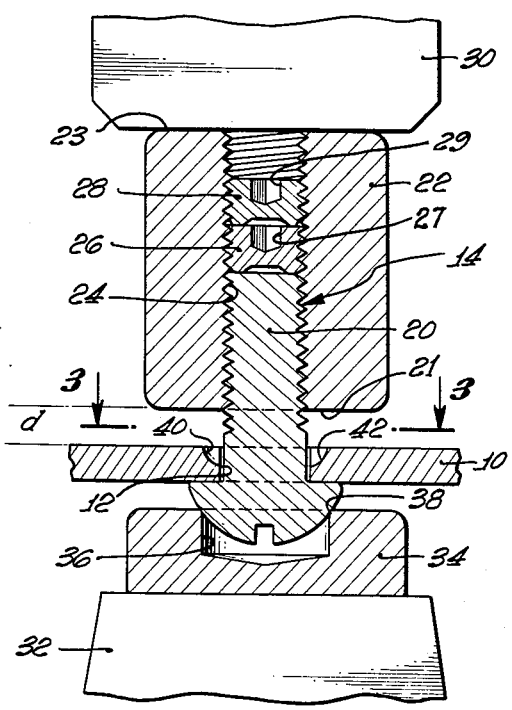
FIGURE 1 is an enlarged fragmentary sectional view illustrating apparatus for affixing a screw to a ported member, such as a ground clamp.
Figure 2:
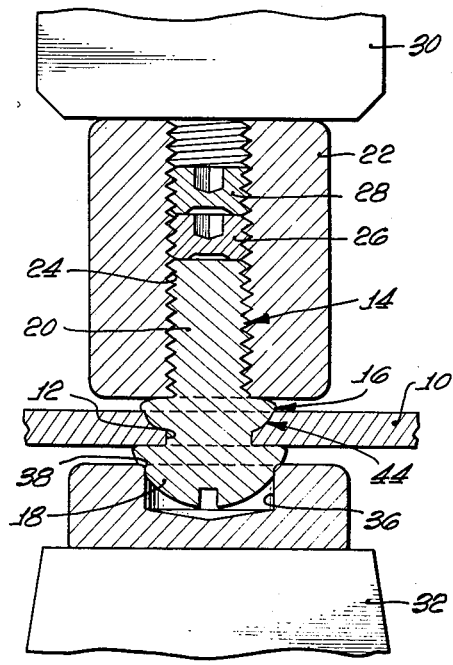
FIG. 2 is a view similar to FIG. 1, but illustrating the parts after the operations have been completed.

In FIG. 1 there is illustrated a base or support member 10 having a hole 12 at which it is desired to affix a screw or stud 14. FIG. 2 illustrates the screw 14 affixed by a ring or collar 16. The ring 16 performs all of the securing functions of a nut, plus others. Furthermore, the ring 16 is integral with the screw or stud itself, and it thus is unnecessary to provide any additional parts.

Since the ring 16 is integral with the screw 14, it can be formed only after screw 14 is positioned relative to the base or support member 10. Furthermore, the projecting shank portion 20 of the screw 14 must be left undistorted. The ring 16 is formed by longitudinally compressing and buckling the screw 14, and localizing the area at which the shank 20 of the screw yields. To accomplish this, a nut member 22 of suitable size and shape is provided.

The member 22 has a threaded aperture 24 that receives the end of the threaded screw shank 20. The member 22 is positioned relative to the shank 20 so that a certain length of the shank corresponding to the dimension d (FIG. 1) along the shank is left unconfined by the member 22. At the same time, the remaining portion of the shank 20 fits within the aperture 24. By longitudinally urging the member 22 and the head 18 toward each other, the exposed portion of the shank 20 flows or buckles, thereby expanding this portion of the shank to form the integral ring 16. The shank 20 preferably enters the member 22 a distance large enough so that the unit pressure at the threads engaged by the member 22 is maintained small. Accordingly, this area of the shank will not be mutilated.

Aperture 24 may extend upon into the nut member 22 a distance corresponding to the length of the shank 20 of screw or stud 14, thus arbitrarily determining dimension d, but is preferably extended through the entire length of nut member 22, as shown in FIGS. 1 and 2, and a headless or Allen head stop screw 26 positioned within the aperture 24 adjustably determines the dimension d. The screw 26 is abutted by the end of the shank 20. A similar headless lock screw 28 locks the positioning screw 26 in appropriate position. Both screws may be provided with non-circular sockets 27 and 29 for operation by a wrench.

A press of the hydraulic, air or other type, indicated digrammatically by a head 30 and a bed or plate 32, buckles the screw 14 by urging the member 22 and the screw head 18 toward each other. The press head 30 engages the end surface 23 of the member 22 remote from the screw head 18, the abutment screws 26 and 28 being received entirely within the aperture 24 to avoid interference.

The screw 14 is shown with head 18 as a round head with conventional slot as this form is in most common, and therefore most economical, use. A screw with a flat, oval, fillister or other type head could be used with equal facility, depending upon the purpose and appearance desired, and the slot omitted if preferred. When screw 14 with round or similar type head is used, the plate 32 preferably does not directly engage the crown of the head 18 in order to ensure against severe distortion or rupture of the head. A seat element 34 is provided for this purpose. It is interposed between the head 18 and the plate or bed 32 and comprises a simple block having a recess 36, thereby defining an annular edge 38 engageable with the head 18 at an area spaced from its crown. Accordingly, there is an area of engagement for the screw head 18 which is disposed in annular fashion about the axis of the screw 14. The recess 36 is sufficiently deep to ensure clearance with the crown of the head 18.

After the ring 16 is formed, the nut member 22 is removed.

The ring 16 not only prevents longitudinal separation of the screw 14 from the member 10, but also prevents angular movement of the screw 14 if desired. At least on that side of the opening 12 at which the ring 16 is located, one or more cavities or recesses 40 and 42 of suitable depth are provided adjoining the opening 12. The cavities 40 and 42 may, if desired, extend entirely through support member 10 and form keyways, and metal at the ring 16 is caused to flow therein to form keys. The screw 14 thus is prevented from moving angularly with respect to its support 10, the hole 12 being made non-angular by the cavities 40 and 42.

Application and removal of the nut member 22 may be speeded by the aid of a rotating friction wheel or other means. Since the member 22 need not be tightened, much less time is necessary than the tightening of a lock nut, for example. The positions of the abutment screw 26 and the lock screw 28, of course, remain unchanged for repeated uses.

Figure 4:
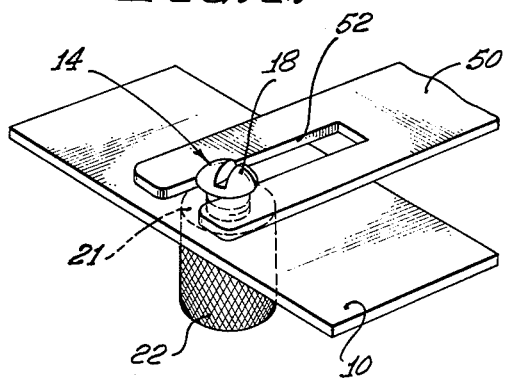
FIG. 4 is a pictorial view on a reduced scale illustrating an alternate gauge that may be used to determine the relative starting position of parts illustrated in the drawings.
Figure 3:
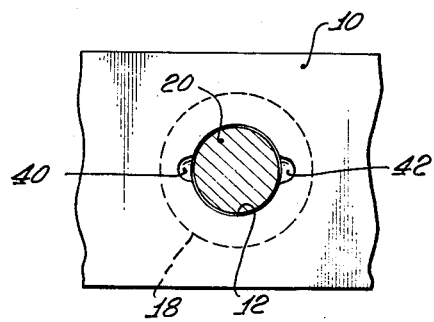
FIG. 3 is a sectional fragmentary view, taken along a plane indicated by line 3—3 of FIG. 1.

In FIG. 4 there is illustrated a simple bifurcated gauge or spacer 50 that may be interposed between the head 18 of the screw 14 and the cooperating surface 21 of the nut member 22. The shank of the screw 14 enters the slot 52 formed between the bifurcations. The member 22 is applied to the screw 14, and the spacer 50 then removed. Appropriate spacing is thus provided in an alternate manner, the thickness of the spacer 50 corresponding to the desired dimension d. Of course, it is immaterial whether the gauge 50 is interposed between the head 18 and the member 10 or between the member 10 and the member 22.

Figure 5:
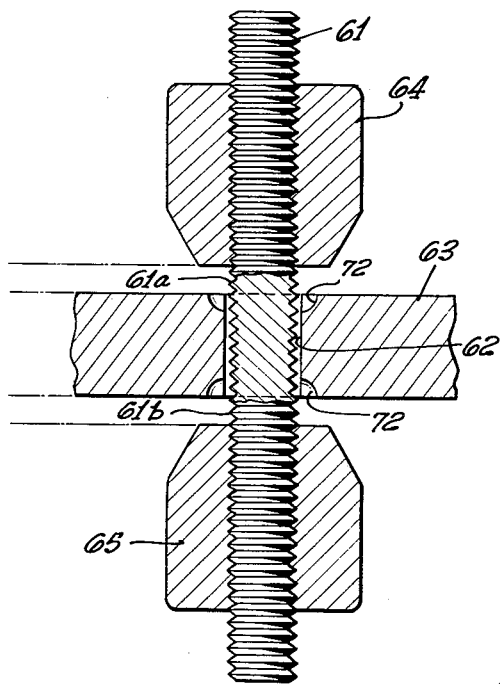
FIG. 5 is a sectional view illustrating apparatus for affixing a stud to an apertured element.

In FIG. 5 a stud 61 is intended to be affixed at an aperture 62 of a plate 63 and so that opposite ends of the stud 61 are accessible. Placement of the stud 61 is accomplished by using two nut members 64 and 65. These nut members are threaded upon opposite ends of the stud 61 after the stud 61 is passed through the aperture 62.

The nuts 64 and 65 are so positioned that exposed areas 61a and 61b of the stud are provided on opposite sides of the plate 63.

Figure 6:
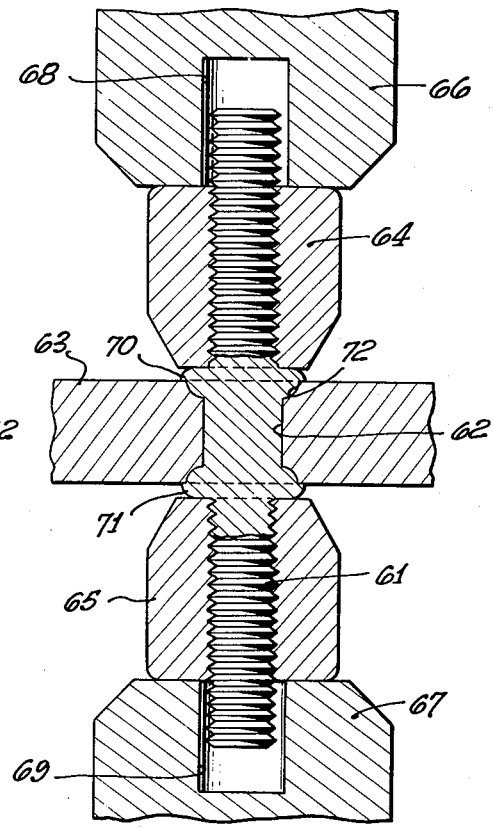
FIG. 6 is similar to FIG. 5, but illustrates the parts after the operations have been completed.

The nut members 64, 65, stud 61 and plate 63 are placed between elements 66 and 67 of a press (FIG. 6) that are relatively movable toward each other. Recesses 68 and 69 in the press elements 66 and 67 allow for entrance of the ends of the stud 61 that, in this instance, project beyond the nut members 64 and 65. Accordingly, the ends of the nut members 64 and 65 can be directly engaged by the press elements 66 and 67.

Rings 70 and 71 are formed on opposite sides of the plate 63 by virtue of the exposed areas 61a and 61b (FIG. 5) of the stud 61. The threads of the stud, except at the plate 63, are not mutilated since pressure is exerted through the threads. One of the rings 70 or 71 serves in place of the head 18 of the screw 14 illustrated in the previous form. Cavities or slots 72 are formed in this instance about both ends of or through the plate aperture 62, if desired, to hold the stud against rotation.

Figure 8:
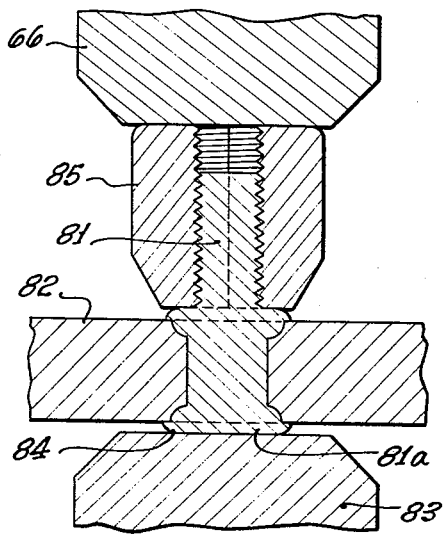
FIG. 8 illustrates in vertical section the parts illustrated in FIG. 7 in a press and after the operations have been completed.
Figure 7:
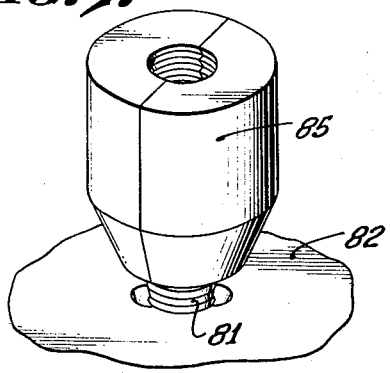
FIG. 7 is a pictorial view illustrating the use of a split nut for facilitating placement of a stud at an apertured element.

In FIG. 7 the stud 81 is fastened to a plate 82 so that only one end projects therefrom. One end of the stud 81, as at 81a, projects beneath or on one side of the plate 82 so that it may be directly engaged by one press element 83, as indicated in FIG. 8. A head or ring 84 is formed by engagement between the press member 83 and the end 81a of the stud 81.

A nut member 85 is placed upon the other end of the stud and used for application of buckling force so that the threads at this end are protected. The member 85 shown in FIG. 7 is an alternate to the nut member 22 in FIGS. 1 and 2, and 64 and 65 in FIGS. 5 and 6. In this instance, the member 85 is split axially to facilitate fast placement on a screw or stud before pressing and its quick removal after pressing. Member 85 is preferably of suitable shape for clamping its two halves together during the pressing operation and with internal threads corresponding in size and length to the screw or stud to be fastened, such as 81 in FIG. 7.

The inventor claims:

1. The method of affixing an externally threaded member having a head to a support member, which comprises: locating the member in an aperture in the support member so that it projects on one side of the support member; and, by the aid of a nut fitting the threaded member, longitudinally compressing the threaded member by applying pressure through its threads while exposing a length of the threaded member adjacent the aperture, thereby deforming the exposed portion of the threaded member to form an integral ring on said one side of said support member and while supporting the threads of the member in the nut against deformation.

2. The method of affixing a threaded member, such as a stud, or headless screw or bolt to a support member, which comprises locating such a threaded member in an aperture in the support member so that it projects partly on both sides of the support member; and longitudinally compressing the threaded member by applying pressure through the threads of the threaded member while exposing lengths of the threaded member on opposite sides of the aperture, thereby deforming the exposed portions of the threaded member to form integral rings or collars on both sides of the support member and while supporting against deformation those threads of the member to which pressure is applied.

3. The method of affixing a threaded member having a head to a support member, which comprises: locating a threaded member in an aperture in the support member so that it projects at least on one side of the support member; positioning a nut member on one end of the threaded member so that a portion of the threaded member at said one side of said support member is exposed; applying a compressive buckling force on the exposed portion of the threaded member by urging the nut member and the other end of said threaded member toward each other, thereby deforming the threaded member at its exposed portion to form an integral ring at the support member while supporting the threads in said nut member against deformation; and thereafter removing the nut member.

4. The method of affixing a threaded member having a head to a support member, which comprises: locating a threaded member in an aperture in the support member so that it projects at least on one side of the support member; positioning an axially split threaded element on one end of the threaded member so that a portion of the threaded member at said one side of said support member is exposed; applying a compressive buckling force on the exposed portion of the threaded member by urging the split element and the other end of said threaded member toward each other, thereby forming an integral ring at the support member while supporting the threads in said split element against deformation; and thereafter removing the split element by separating the parts of said element.

5. The method of affixing a threaded member with a head, such as a screw or stud to a support member, which comprises: locating a screw in an aperture in the support member so that the head thereof is on one side and the shank thereof projects on the other side of the support member; positioning a nut member in threaded engagement with the threads on the shank so that the shank enters the nut member a distance less than the length of the shank so that a portion thereof is exposed; the length of the exposed portion corresponding substantially to the diameter of the shank; the nut member engaging the shank along a distance several times the length of said exposed portion; applying a compressive buckling force on the shank through its threads by urging the head and nut member toward each other, thereby bulging, deforming and compressing the exposed portion of said shank to form an integral ring adjacent said support member and on the side of the support member opposite the head on the threaded member while supporting the threads of the shank in said nut member against deformation, the said length of the exposed portion being sufficient to form a ring of adequate size; and thereafter removing the nut member.

6. The method of affixing a screw to a support member, which comprises: locating a screw in an aperture in the support member so that the head thereof is on one side and the shank thereof projects on the other side of the support member; positioning a nut member in threaded engagement with the threads on the shank so that the shank enters the nut member a distance less than the length of the shank so that a portion thereof is exposed; applying a longitudinal compressive force on the screw by annularly engaging the head of the screw and by engaging the nut member respectively between movable parts of a press, thereby deforming the screw at its exposed portion to form an integral ring on the shank adjacent the support member and on the side of the support member opposite the head on the threaded member, while supporting the screw threads in the nut member against deformation.

7. The method of affixing a threaded member with a head, such as a screw or stud to a support member, which comprises: locating a screw or stud in an aperture in the support member so that the head thereof is on one side and the shank thereof projects on the other side of the support member; positioning to the limit allowed a nut member in threaded engagement with the threads on the shank while positioning a gauge between the nut member and the head of the screw or stud; removing the gauge to define an exposed portion of the screw or stud; thereafter urging the nut member and the head toward each other to buckle and deform the exposed portion of the shank to form a ring on the shank adjacent the support member and on the side of the support member opposite the head on the threaded member, while supporting the threads in the nut member against deformation during the operation of deforming the exposed portion of the shank; and finally removing the nut member.

8. In a device for locking a screw or stud against removal from an aperture in a support; a nut engaging the screw or stud; and means applying a compressive force between the nut and the other end of the screw or stud for compressing that part of the screw or stud disposed between the support and the nut beyond the elastic limit of the screw or stud.

9. In a device for locking a screw or stud against removal from an aperture in a support: a nut engaging the screw; means applying a compressive force between the nut and the other end of the screw for compressing that part of the screw disposed between the support and the nut beyond the elastic limit of the screw or stud; and means limiting the extent to which the screw can be engaged in the nut.

References Cited in the file of this patent

UNITED STATES PATENTS

| | | |
|---|---|---|
| 418,198 | Lemp et al. | Dec. 31, 1889 |
| 451,390 | Darrow | Apr. 28, 1891 |
| 791,548 | Fischer | June 6, 1905 |
| 1,342,907 | Holdsworth | June 8, 1920 |
| 2,089,790 | Halpern | Aug. 10, 1937 |
| 2,366,756 | Spencer | Jan. 9, 1945 |
| 2,557,609 | McFadden | June 19, 1951 |
| 2,690,279 | Ward | Sept. 28, 1954 |
| 2,763,314 | Gill | Sept. 18, 1956 |

FOREIGN PATENTS

| | | |
|---|---|---|
| 436,706 | Great Britain | Oct. 16, 1935 |